United States Patent Office 3,154,983
Patented Nov. 3, 1964

3,154,983
MACHINE TOOL DRIVES
Donald Firth and Roger Harvey Yorke Hancock, East Kilbride, Glasgow, Scotland, assignors to Council for Scientific and Industrial Research, London, England, a corporate body
Filed May 1, 1963, Ser. No. 287,165
Claims priority, application Great Britain, May 7, 1962, 17,393/62
9 Claims. (Cl. 82—28)

This invention relates to machine tool and the like drives and particularly, although not exclusively, to drives for work or tool spindles. The main characteristic of such drives is that the driving shaft should be free of axial "float" to ensure the accurate positioning of the driven component—for example, the work in a lathe, or a rotary cutter in a tool head.

Hitherto, it has been customary to drive such spindles through appropriate gearing, often with the interposition of some ratio change mechanism whereby a desired spindle speed can be selected according to the requirements of the work to be done. However, such drives are not entirely flexible as regards torque and speed characteristics, and frequently the speed of the driven spindle has to be a compromise owing to the need for keeping the mechanism down to manageable proportions for reasons of both physical dimensions and economy.

Within a given range of speeds, a hydrostatic transmission offers infinite variability coupled with the facility to maintain either torque or power substantially constant, and the direct coupling of a hydrostatic motor output shaft with the work or tool spindle of a machine tool could theoretically provide an ideal drive arrangement in many machine tools—for example, a lathe, where the motor shaft would also constitute the headstock spindle.

However, if a swash plate motor of the kind described and illustrated in the specification and drawings of United States Patent No. 3,089,427, of May 14, 1963, were to be selected for this purpose, considerable difficulty would normally arise from the fact that the drive shaft of the motor must have a measure of freedom of end float relative to the motor casing, which is customarily bolted or otherwise fixedly located in a rigid bed or frame. This end float, though small, is essential in order to accommodate small distortions under load and to maintain adequate working clearances between the cylinder block and the port block at varying loads.

If, therefore, the conventional form of hydrostatic motor were to be used to drive directly a work or tool spindle which must be free from axial float, it would be necessary to interpose a coupling between the motor drive shaft and the spindle which permits the necessary axial float. Furthermore, in order that adequate axial freedom of movement of the motor components should be provided, the coupling must inevitably represent a loss in torsional rigidity in the drive shaft which may foster irregularities of machining—for example, as a result of tool chatter. The present invention aims at overcoming this disadvantage.

In a machine tool or like drive mechanism according to the present invention a hydrostatic machine has its cylinder block integral with or rigidly secured to a drive shaft having substantially no freedom of axial travel relative to a machine bed or frame on which the motor is to be mounted. The port block, swash plate, and end steady bearing of this motor are united by a yoke or cage having the necessary torsional rigidity to withstand the maximum torque reaction of the motor under full load, and this yoke or cage is prevented from rotating under torque reaction by suitable abutment means engageable directly or indirectly with a part of the machine bed or frame in such a way as to permit the requisite axial float of the yoke or cage relative to the cylinder block under operating conditions.

In this way, a hydrostatic motor can be specifically designed to fit the machine tool, and if desired, automatic torque reaction compensation can be applied to the yoke or cage so as to damp out any tendency for the yoke, and hence of the machine shaft, to oscillate and cause machining errors and blemishes.

For any given set of operating conditions, the differential force derived from a pair of opposed abutment plungers of different effective diameters subjected to the same line pressure will balance the mean reaction torque on the motor cage. Instantaneous fluctuations about this mean can be absorbed by opposed springs and hydraulic or other dampers.

Obviously, a simpler arrangement of torque reaction resistor can be adopted if preferred—for example, the torque reaction arm may be bonded or otherwise secured to a rubber or like block in a fixed housing.

One construction of swash plate motor according to the present invention, as adapted to the headstock of a lathe, is illustrated in the accompanying drawings in which.

Figure 1:
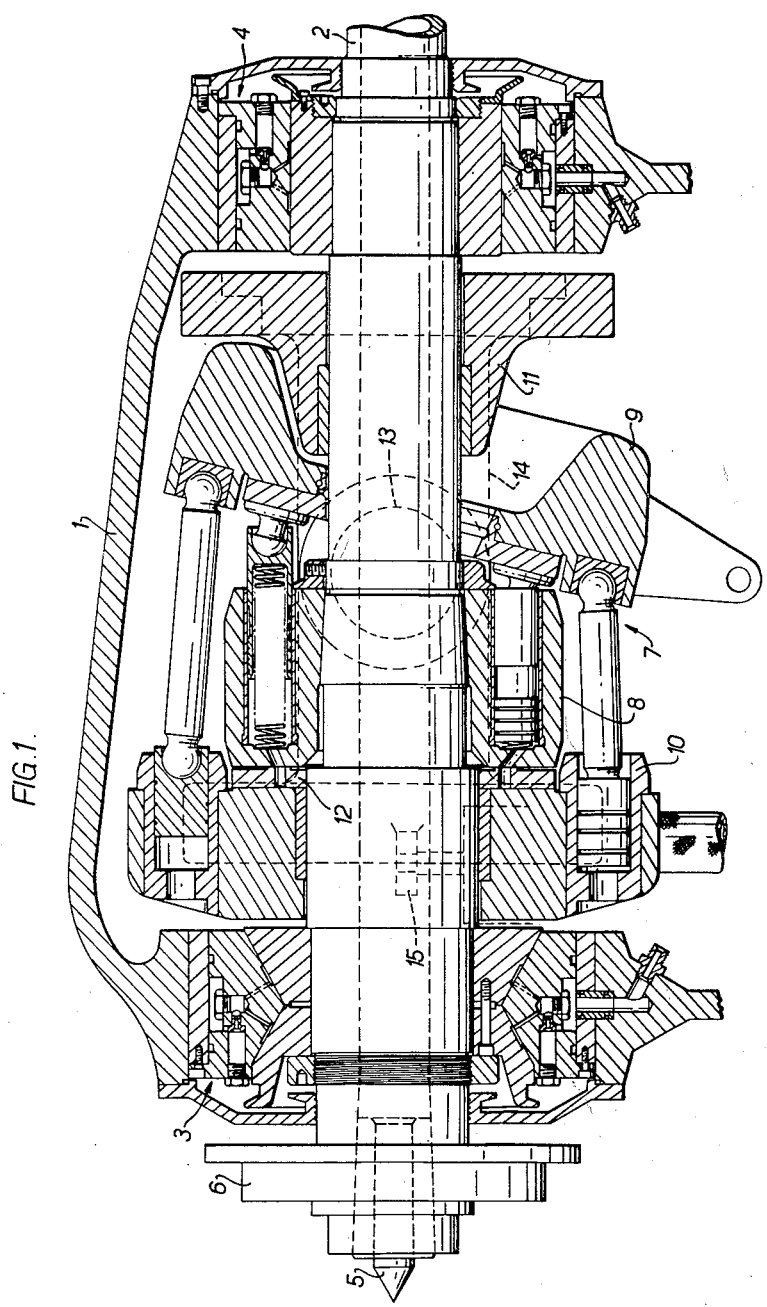
FIGURE 1 is a vertical section through the headstock spindle axis.
Figure 2:
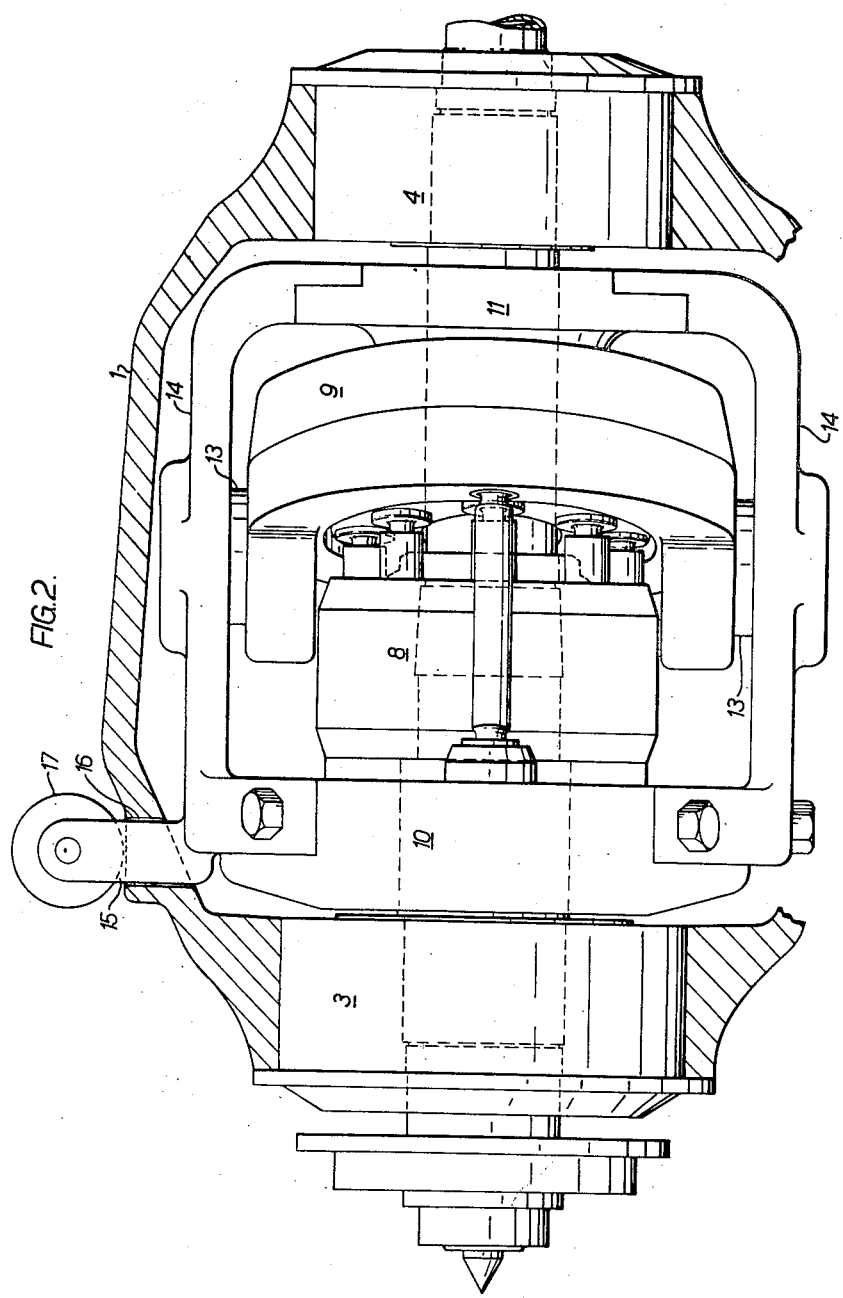
FIGURE 2 is a plan view of the motor components with the headstock casting broken away.

Referring first to FIGURES 1 and 2 of the drawings, the casting 1 of a lathe headstock carries a tubular headstock spindle 2 in front and rear bearings 3, 4. The front bearing 3 is a thrust bearing which serves to locate the headstock spindle 2 against both axial float and radial displacement, whilst the rear bearing 4 is a conventional plain bearing. A conventional live centre and back plate assembly are shown at 5, 6 respectively.

Within the headstock casting 1 is mounted a swash plate motor 7 consisting essentially of a cylinder block 8, swash plate 9, port block 10 and steady bearing 11. Between the cylinder block 8 and port block 10 is located a port plate 12 which is conveniently of the floating type disclosed in the specification and drawings of United States Patent No. 3,089,427 of May 14, 1963. The swash plate 9 is mounted on trunnion bearings 13 which are carried in a rigid yoke 14 (FIGURE 2) which rigidly unites the port block 10 and the steady bearing 11. This yoke is sufficiently rigid to withstand the torque reaction from the headstock spindle 2 under maximum load but is free to float axially within the headstock casting 1 to the extent required by the operating characteristics of the motor 7.

Secured to or integral with the yoke 14 is a torque reaction member in the form of a lateral torque arm 15 which projects through a clearance slot or aperture 16 in the headstock casting 1. The outer end of the torque arm 15 is engaged with an abutment fixed to the headstock casting. In FIGURE 2 of the drawings, the abutment is represented as an hydraulic piston and cylinder motor 17 the piston of which is linked to the arm 15 to allow the latter the necessary freedom of axial travel whilst the cylinder is directly connected to the high pressure circuit of the motor.

Since the torque reaction from the tool may be reversible depending on the nature of the machine to which the invention is applied, the torque compensating motor 17 may either be double-acting or two motors may be mounted to act oppositely on the torque arm 15 according to the direction of rotation of the work or tool spindle.

Figure 3:
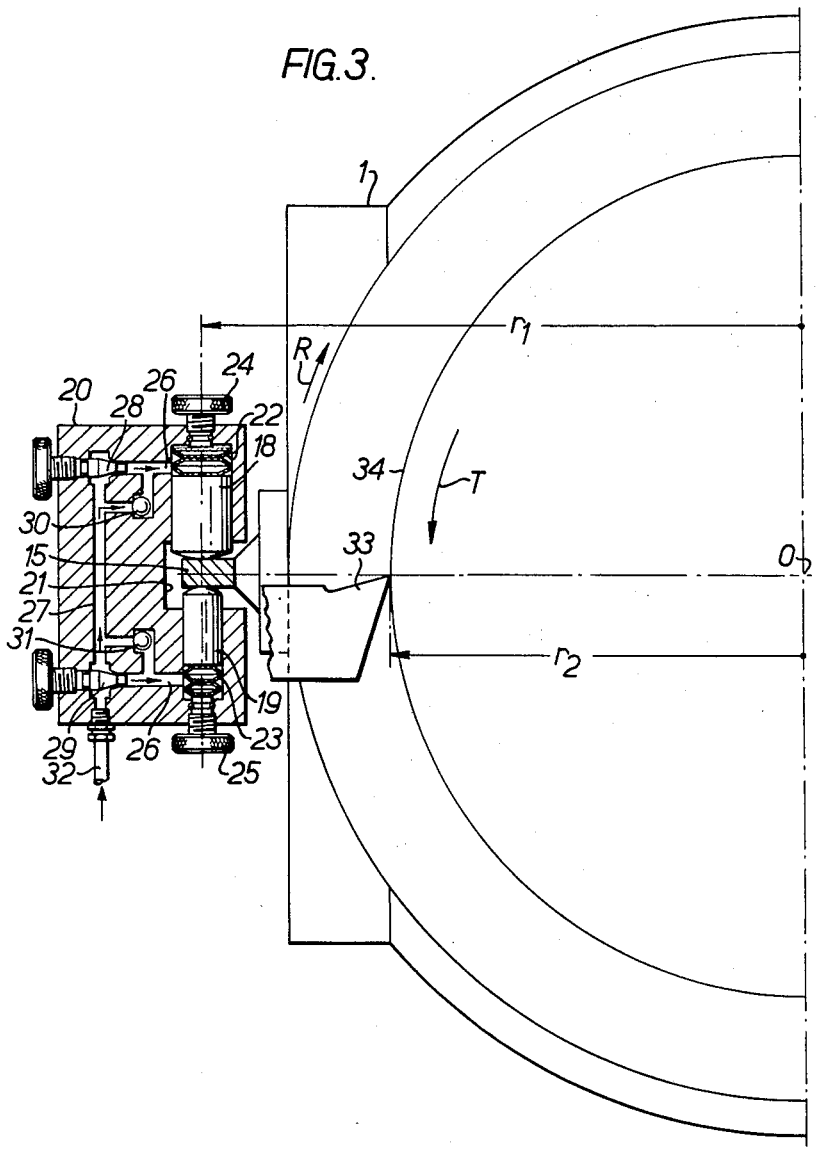
FIGURE 3 illustrates one form of torque reaction absorbing unit.
Figure 4:
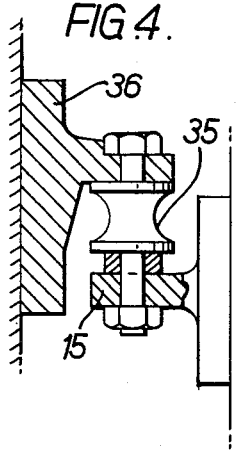
FIGURES 4–7 are schematic illustrations of alternative and relatively simple torque reaction absorbing means.
Figure 5:
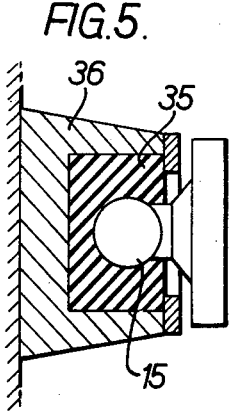
Figure 6:
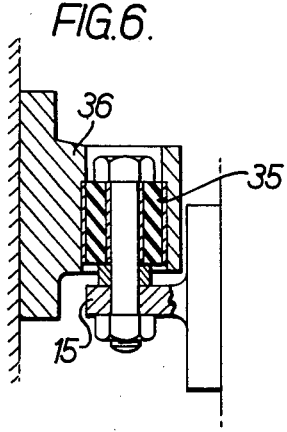
Figure 7:
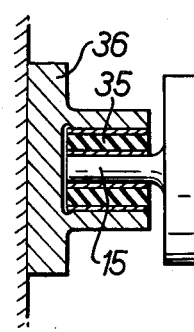

FIGURE 3 shows schematically an arrangement of torque reaction abutment and damper unit. The torque arm 15 is embraced by a pair of coaxially opposed plungers 18, 19 working in respective cylinders in a block 20 secured to the main frame or bed of the machine (not shown). The outer ends of the plungers 18, 19 project into an open slot or cavity 21 within which the end of the torque arm 15 lies. Behind each plunger is a respective stiff spring 22, 23 located in the inner end of the corresponding cylinder and bearing against a respective adjusting screw 24, 25.

A port 26 opens into the inner end of each cylinder, and the two ports 26 are interconnected by a duct 27 and needle valves 28, 29, each valve being by-passed by a respective non-return valve 30, 31. An inlet pipe 32 leads from a convenient point in the pressure line of the hydrostatic transmission circuit to the needle valve 29, so that each plunger cylinder is exposed, through its port 26, to line pressure. The thrusts exerted by the plungers 18, 19 are thus proportional to their diameters, the differential thrust being thus proportional to the torque T due to the cutting load at the tool 33, and hence to the torque reaction R at the torque arm 15.

The radius of action $r_1$ of the differential thrust of the plungers 18, 19 is made as nearly equal as possible to the mean radius of action $r_2$ of the tool 33 on the work 34. The diameters of the plungers 18, 19 are chosen so that the moment of their differential thrust about the axis O of the headstock spindle balances the torque reaction R when the tool 33 acts at this mean radius $r_2$. Fluctuations in this torque reaction are balanced by the springs 22, 23, whilst the needle valves 28, 29 and non-return valves 30, 31 constitute an hydraulic damper on oscillations of the torque arm 15, each non-return valve being designed to ensure that oil forced out of the respective cylinder must flow through the associated needle valve 28 or 29.

In each of FIGURES 4–7, the torque arm 15 is supported through a rubber block or bushing 35 from a reaction block 36 on the machine bed or frame. The inherent damping of the rubber serves to reduce oscillations of the torque arm 15 whilst the resilience of the rubber provides the force for balancing the torque reaction.

Figure 8:
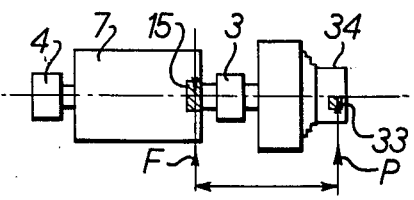
FIGURE 8 is a diagrammatic side view of a complete assembly of motor and drive shaft.

As shown in the diagram of FIGURE 8, the point of application of the torque reaction balancing force F on the torque arm 15 is as close as practicable in the direction of the headstock spindle axis to the point of application of the tool load P on the work 34 so as to reduce to a minimum the resultant couple on the work spindle which is resisted by the main (headstock) bearing 3. Furthermore, the point of application of the force F on the torque arm 15 is ideally located in the same plane, radial to the work 34 and containing the headstock spindle axis, as the point of engagement therewith of the tool 33, both points lying on the same side of the vertical plane containing the headstock spindle axis. In this way, the total net radial on the bearing 3 is kept to a minimum.

Any rotation of the yoke or cage 14 by torque reaction should be kept to a minimum, but will not affect the timing of the port events in the motor since both the swash plate 9 and port block 10 are constrained by the yoke 14 to move in unison.

Although the headstock spindle 2 has been described and illustrated as being of unitary construction, constituting also the motor shaft, it may be of two-part construction if preferred, the two parts being spigoted and keyed together to maintain the necessary axial rigidity. This form of construction may be conveniently adopted in cases where the cylinder block 8 is formed in one piece with the shaft.

We claim:
1. Machine drive mechanism comprising a rigid frame for mounting the mechanism; a drive shaft; a front bearing in said frame for mounting said drive shaft without axial float; a swash plate type hydraulic motor assembly comprising a cylinder block rigid with said drive shaft; a port block freely surrounding said shaft to co-operate with said cylinder block; a swash plate surrounding said drive shaft with clearance, and an end steady bearing beyond said swash plate, a rigid yoke uniting said steady bearing, swash plate, and port block, and a torque reaction member on said yoke for transmitting to said fixed frame the reaction to the driving shaft torque.

2. Machine drive mechanism comprising a rigid frame; a drive shaft in said frame; a thrust bearing for said drive shaft to prevent axial float thereof; a swash plate motor cylinder block rigid with said shaft; a tiltable swash plate embracing said shaft with clearance; a port block co-operating with said cylinder block, a steady bearing on said shaft beyond said swash plate; a rigid yoke interconnecting said port block, swash plate, and steady bearing; and a torque reaction member on said yoke for transmitting to said rigid frame the reaction to the driving torque.

3. Machine drive mechanism comprising a rigid frame; a drive shaft mounted without axial float in said frame; a swash plate motor assembly on said drive shaft and including a rigid yoke for interconnecting the relatively non-rotatable components of said motor assembly; and a torque reaction member on said yoke for transmitting to said rigid frame the reaction to the driving torque on said drive shaft.

4. Machine drive mechanism comprising a rigid frame; a drive shaft mounted without axial float in said frame; a swash plate motor assembly on said drive shaft and including a rigid yoke for interconnecting the relatively non-rotating components of said motor assembly, a torque reaction member projecting radially from said yoke; and resilient abutment means on said rigid frame for engagement by said torque reaction member.

5. Machine drive mechanism according to claim 4 wherein the abutment is hydraulically loaded at a fluid pressure which is proportional to the driving torque of the motor.

6. Machine drive mechanism according to claim 5 wherein the abutment comprises a plunger exposed to the line pressure to the motor.

7. Machine drive mechanism according to claim 6 wherein the abutment comprises a pair of opposed plungers of different diameters connected in parallel to the line pressure the diameters of the plungers being chosen so that the resultant force exerted on the torque reaction member balances a predetermined value of torque reaction.

8. Machine drive mechanism according to claim 7 wherein a needle valve is connected in the circuit to each plunger to provide hydraulic damping of oscillations of the plungers.

9. Lathe headstock drive comprising a headstock, a headstock spindle; a thrust bearing in said headstock supporting said headstock spindle without axial float; an hydrostatic swash plate motor on said headstock spindle including a rigid yoke member for uniting the relatively non-rotatable components of said motor; a torque reaction member projecting radially from said rigid yoke member, and resilient abutment means on said headstock for engaging said torque reaction member.

References Cited in the file of this patent

UNITED STATES PATENTS

| 2,098,214 | Benedek | Nov. 9, 1937 |
| 3,117,529 | Firth et al. | Jan. 14, 1964 |